United States Patent
Nemmer et al.

(10) Patent No.: US 11,701,947 B2
(45) Date of Patent: Jul. 18, 2023

(54) SYSTEM AND METHOD FOR ROBUST AUTOMATIC CONTROL OF THE AIR-CONDITIONING SYSTEM IN A VEHICLE

(71) Applicant: Bayerische Motoren Werke Aktiengesellschaft, Munich (DE)

(72) Inventors: Christian Nemmer, Unterschleissheim (DE); Marcus Rehwinkel, Munich (DE); Gerald Ruehl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 267 days.

(21) Appl. No.: 16/928,652

(22) Filed: Jul. 14, 2020

(65) Prior Publication Data
US 2021/0016630 A1    Jan. 21, 2021

(30) Foreign Application Priority Data

Jul. 15, 2019    (DE) ...................... 10 2019 119 062.2

(51) Int. Cl.
*B60H 1/26* (2006.01)
*G01S 13/88* (2006.01)
(Continued)

(52) U.S. Cl.
CPC ............. *B60H 1/26* (2013.01); *B60H 3/0085* (2013.01); *G01J 1/4204* (2013.01); *G01P 3/00* (2013.01);
(Continued)

(58) Field of Classification Search
CPC .... B60H 1/26; B60H 3/0085; B60H 1/00771; B60H 1/00785; B60H 1/008;
(Continued)

(56) References Cited

U.S. PATENT DOCUMENTS 10,475,127 B1 * 11/2019 Potter ...................... B60R 25/04
2003/0191568 A1 * 10/2003 Breed .................... B60W 40/06
701/469
(Continued)

FOREIGN PATENT DOCUMENTS

DE    197 37 272 A1    3/1999
DE    103 20 745 A1    12/2004
(Continued)

OTHER PUBLICATIONS

German-language Office Action issued in German Application No. 10 2019 119 062.2 dated Jun. 5, 2020 (four (4) pages).
(Continued)

*Primary Examiner* — David P Porta
*Assistant Examiner* — Mamadou Faye
(74) *Attorney, Agent, or Firm* — Crowell & Moring LLP

(57) ABSTRACT

A system and method for robust automatic control of an air-conditioning system in a vehicle includes at least one sensor configured to continuously capture technical driving parameters of the vehicle. The system has a computing unit configured to determine a current air quality from the captured technical driving parameters by way of a suitable algorithm. The system has a control unit configured to control the air-conditioning system in the vehicle, wherein the control of the air-conditioning system includes activating the recirculation circuit of the air-conditioning system and/or activating the fresh-air circuit of the air-conditioning system with reference to the determined air quality.

20 Claims, 2 Drawing Sheets

(51) Int. Cl.
*G01S 13/86* (2006.01)
*G01P 3/00* (2006.01)
*G01J 1/42* (2006.01)
*B60H 3/00* (2006.01)
*G01W 1/14* (2006.01)

(52) U.S. Cl.
CPC .............. *G01S 13/86* (2013.01); *G01S 13/88* (2013.01); *G01W 1/14* (2013.01); *G01J 2001/4266* (2013.01)

(58) Field of Classification Search
CPC ............. B60H 1/00849; B60H 1/00735; G01J 1/4204; G01J 2001/4266; G01P 3/00; G01S 13/86; G01S 13/88; G01S 17/88; G01S 13/867; G01S 13/52; G01S 13/58; G01S 19/42; G01W 1/14; B60S 1/00; G01N 15/06; G01N 33/0031; G01N 33/0075; G01N 2015/0693

See application file for complete search history.

(56) References Cited

U.S. PATENT DOCUMENTS

| | | | |
|---|---|---|---|
| 2011/0046828 A1* | 2/2011 | Chander | H02J 7/0013 180/65.21 |
| 2012/0260575 A1* | 10/2012 | Monaco | E05F 15/668 49/31 |
| 2013/0141578 A1 | 6/2013 | Chundrlik, Jr. et al. | |
| 2016/0318368 A1* | 11/2016 | Alger | G08G 1/096725 |
| 2017/0113512 A1* | 4/2017 | Park | G06V 40/18 |
| 2017/0357637 A1* | 12/2017 | Nell | G10L 15/22 |
| 2019/0275856 A1* | 9/2019 | Cronin | B60H 1/247 |

FOREIGN PATENT DOCUMENTS

| | | |
|---|---|---|
| DE | 10 2004 035 882 A1 | 2/2006 |
| DE | 10 2005 044 005 A1 | 3/2007 |
| DE | 10 2006 057 275 A1 | 6/2008 |
| DE | 10 2009 028 328 A1 | 2/2011 |
| DE | 10 2011 055 684 A1 | 5/2013 |
| DE | 10 2016 012 168 A1 | 5/2017 |

OTHER PUBLICATIONS

German-language Office Action issued in German Application No. 10 2019 119 062.2 dated May 27, 2022 (six (6) pages).

* cited by examiner

SYSTEM AND METHOD FOR ROBUST AUTOMATIC CONTROL OF THE AIR-CONDITIONING SYSTEM IN A VEHICLE

CROSS REFERENCE TO RELATED APPLICATION

This application claims priority under 35 U.S.C. § 119 from German Patent Application No. 10 2019 119 062.2, filed Jul. 15, 2019, the entire disclosure of which is herein expressly incorporated by reference.

BACKGROUND AND SUMMARY OF THE INVENTION

The present invention relates to a system and a method for robust automatic and inexpensive control of the air-conditioning system in vehicles.

The degradation of air quality as a result of noxious gases, fine dusts, etc. is steadily increasing and is picked up by the media more and more frequently. It has been found that this degradation can be harmful to the health of human beings in the long term. Human beings are therefore increasingly attempting to protect themselves from this degradation by means of breathing masks, air filters, etc. In a vehicle too, in which there can be exposure to a particularly high level of pollution from noxious gases for example in queues, in tunnels, etc., air quality in the vehicle interior plays an ever more significant role. In this regard, it is known practice to use air quality sensors in or on a vehicle in order to measure the burden on the vehicle occupants as a result of noxious gases from outside and/or as a result of air quality degradation in the vehicle interior (e.g. as a result of smokers and other fine-dust sources) and to take action against this by means of control systems of the air-conditioning system controller. As such, depending on the air quality degradation from outside, the recirculation mode in a vehicle can be activated, with an AUC (automatic recirculation control) sensor for detecting nitrous oxides ($NO_x$) and carbon monoxide (CO) and/or a fine-dust sensor for detecting fine-dust pollution being used. A suitable vehicle interior sensor can be used to detect the air quality in the vehicle interior (e.g. as a result of smokers and other fine-dust sources). Recirculated air and/or the supply of fresh air in the vehicle can be activated by the sensors depending on the detected pollution. A disadvantage in this case is that the development and production costs of sensors for air quality measurement are very high.

The object of the invention is to provide a solution that allows robust, automatic and inexpensive control of the air-conditioning system in vehicles.

This object is achieved according to the invention by the features of the independent claims. Preferred embodiments are the subject of the dependent claims.

The aforementioned object is achieved by a system for robust automatic control of an air-conditioning system in a vehicle, comprising:
- a sensor configured to continuously capture technical parameters with reference to the vehicle;
- a computing unit configured to determine an air quality from the captured technical parameters; and
- a control unit configured to control the air-conditioning system in the vehicle, wherein the control comprises activating the recirculation circuit of the air-conditioning system and/or activating the fresh-air circuit of the air-conditioning system with reference to the determined air quality.

The system comprises at least one vehicle. The term vehicle, within the context of the document, comprises mobile means of transport that are used to transport people (passenger traffic), goods (freight traffic) or tools (machines or implements). In particular, the term vehicle comprises motor vehicles and motor vehicles that can be driven electrically at least some of the time (electric car, hybrid vehicles).

The vehicle can be controlled by a vehicle driver. Furthermore or alternatively, the vehicle can be a vehicle driving in automated fashion at least some of the time. The term "vehicle driving in automated fashion" or "automated driving" can be understood within the context of the document to mean driving with automated longitudinal or transverse guidance or autonomous driving with automated longitudinal and transverse guidance. Automated driving can be for example driving for a relatively long time on the freeway or driving for a limited time when parking or maneuvering. The term "automated driving" covers automated driving with an arbitrary level of automation. Exemplary levels of automation are assisted, semiautomated, highly automated or fully automated driving. These levels of automation have been defined by the German Federal Highway Research Institute (BASt) (see BASt publication "Forschung kompakt", issue November 2012). Assisted driving involves the driver continually performing the longitudinal or transverse guidance while the system undertakes the respective other function within certain boundaries. Semiautomated driving involves the system undertaking the longitudinal and transverse guidance for a certain period of time and/or in specific situations, with the driver needing to continually monitor the system as in the case of assisted driving. Highly automated driving involves the system undertaking the longitudinal and transverse guidance for a certain period of time without the driver needing to continually monitor the system; however, the driver must be capable of undertaking the vehicle guidance within a certain time. In the case of fully automated driving, the system can manage the driving automatically in all situations for a specific application; this application no longer requires a driver. The aforementioned four levels of automation correspond to SAE levels 1 to 4 of the SAE (Society of Automotive Engineering) J3016 standard. Further, there is also provision for SAE level 5 in SAE J3016 as the highest level of automation, which is not included in the definition from the BASt. SAE level 5 corresponds to driverless driving, wherein the system can manage all situations automatically for the entire journey in the same way as a human driver.

The vehicle comprises at least one sensor configured to continuously capture technical parameters with reference to the vehicle. In other words, the sensor captures technical values with reference to the vehicle. The sensor does not capture values that relate to air quality. In other words, the at least one sensor is not an air quality sensor (e.g. AUC (automatic recirculation control) sensor for detecting nitrous oxides ($NO_x$) and carbon monoxide (CO) and/or fine-dust sensor for detecting fine-dust pollution and/or vehicle interior sensor for detecting air quality in the vehicle interior (e.g. as a result of smokers and other fine-dust sources) in or on the vehicle, in order to measure the burden on the vehicle occupants as a result of noxious gases from outside and/or as a result of air quality degradation in the vehicle interior (e.g. as a result of smokers and other fine-dust sources)).

The vehicle comprises a computing unit configured to receive the captured technical driving parameters and to use a suitable algorithm to process them in order to determine an air quality from the captured technical driving parameters.

The vehicle comprises a control unit configured to control the recirculation and/or fresh-air circuit of the air-conditioning system in the vehicle depending on the determined air quality. By way of example, if good air quality is determined in the exterior of or outside the vehicle, the air-conditioning system of the vehicle can be controlled such that the fresh-air circuit is activated, whereas if poor air quality is determined in the exterior of or outside the vehicle, the air-conditioning system of the vehicle can be controlled such that the recirculation circuit is activated. Furthermore or alternatively, if poor air quality is determined in the vehicle, the air-conditioning system of the vehicle can be controlled such that the fresh-air circuit is activated, whereas if good air quality is determined in the interior of the vehicle, the air-conditioning system can be controlled such that the recirculation circuit is activated.

Advantageously, it is therefore possible to produce automatic, robust and inexpensive control of the recirculation circuit and/or fresh-air circuit of an air-conditioning system in a vehicle, since expensive, separate air quality sensors for determining the air quality in the exterior and/or in the interior of the vehicle can be dispensed with.

Preferably, the at least one sensor comprises at least one video camera, wherein the captured technical driving parameters comprise the image data captured by the video camera.

The at least one video camera can comprise an interior camera. The computing unit can evaluate the data or image data captured by the interior camera and for example detect smoke in the interior of the vehicle by means of suitable image recognition algorithms and determine that the air quality in the interior of the vehicle is poor. Furthermore or alternatively, the at least one video camera can comprise at least one camera aimed at the outside or outside the vehicle. The computing unit can evaluate the image data by means of suitable algorithms and determine an air quality in the exterior of or outside the vehicle therefrom. By way of example, the computing unit, on determining that there are a multiplicity of vehicles around the vehicle, can determine that the air quality outside is poor, whereas, if it determines that there are natural objects (e.g. trees, lakes, forest, etc.) around the vehicle, the air quality outside the vehicle can be determined as good.

Furthermore or alternatively, the at least one sensor can comprise a position determination unit, wherein the captured technical driving parameters can comprise a current geographical position of the vehicle and/or a current number of real-time satellite connections and/or driving parameters pertaining to the accuracy of the position determination.

A position determination unit or position determination sensor can be used to determine a geographical position by using a navigation satellite system. The navigation satellite system can be any current or future Global Navigation Satellite System (GNSS) for position determination and navigation by receiving the signals from navigation satellites and/or pseudolites. By way of example, it can be the Global Positioning System (GPS), Global Navigation Satellite System (GLONASS), Galileo positioning system and/or Bei-Dou Navigation Satellite System.

The captured technical driving parameters can comprise the current geographical position of the vehicle. The computing unit can determine a current air quality from the current geographical position by taking into consideration a current time. Furthermore or alternatively, the captured technical driving parameters can comprise a number of satellite connections from the position determination unit to the navigation satellite system and/or a signal quality of the satellite connection(s) to the navigation satellite system. The computing unit can use a suitable algorithm to determine from these technical driving parameters whether the vehicle is on a clear road (e.g. a multiplicity of satellite connections having high signal quality), in a tunnel (e.g. no satellite connection), between high-rise buildings (e.g. a few satellite connections having poor signal quality), in a parking garage and/or in a garage, and can determine a probable air quality in the exterior of or outside the vehicle therefrom. By way of example, it is possible to determine that the air quality is good on a clear road, whereas the air quality is poor, discernible from different driving parameters, in a tunnel, parking garage and/or garage.

Furthermore or alternatively, the at least one sensor can comprise a radar sensor. In this case, the captured technical driving parameters can comprise detected objects and/or a speed of detected objects in the surroundings of the vehicle. The computing unit can use a suitable algorithm to determine an applicable air quality in the exterior of the vehicle from the detected objects and/or a number of the detected objects and/or the type of the detected objects and/or the speed of the detected objects in the exterior of or outside the vehicle. By way of example, when a multiplicity of objects are detected around the vehicle and/or when objects are moving around the vehicle, the computing unit can determine that the air quality outside the vehicle may be poor. In another example, when there are very few to absolutely no objects detected around the vehicle, the computing unit can determine that the air quality outside the vehicle is good.

Furthermore or alternatively, the at least one sensor can comprise at least one lidar sensor. In this case, the captured technical driving parameters can comprise detected objects and/or a speed of detected objects in the surroundings of the vehicle. The computing unit can use a suitable algorithm to determine an applicable air quality in the exterior of the vehicle from the detected objects and/or a number of the detected objects and/or the type of the detected objects and/or the speed of the detected objects in the exterior of or outside the vehicle. By way of example, when a multiplicity of objects are detected around the vehicle and/or when objects are moving around the vehicle, the computing unit can determine that the air quality outside the vehicle may be poor. In another example, when there are very few to absolutely no objects detected around the vehicle, the computing unit can determine that the air quality outside the vehicle is good.

Furthermore or alternatively, the at least one sensor can comprise at least one ultrasonic sensor. In this case, the captured technical driving parameters can comprise detected objects and/or the distance from detected objects and/or static and dynamic objects in the immediate surroundings of the vehicle. The computing unit can use a suitable algorithm to determine an applicable air quality in the exterior of the vehicle from the detected objects and/or a number of the detected objects and/or the type of the detected objects and/or the speed of the detected objects in the immediate surroundings of the vehicle. By way of example, when there are a multiplicity of objects detected and/or when objects are moving in the immediate surroundings of the vehicle, the computing unit can determine that the air quality outside the vehicle is poor. In another example, when there are very few to absolutely no objects detected in the immediate surroundings of the vehicle, the computing unit can determine that the air quality outside the vehicle is good.

Furthermore or alternatively, the at least one sensor can comprise a light sensor. In this case, the captured technical driving parameters can comprise a current brightness value and/or a change in the current brightness value. By way of example, the computing unit can use a suitable algorithm to determine a characteristic change in the brightness value outside the vehicle. A characteristic change in the brightness value can be a falling brightness value during the day or when a high brightness value is prevalent. In daylight, this indicates entry into a tunnel, an underground garage, etc. Analogously, a characteristic change in the brightness value can be a rising brightness value at night or when a low brightness value is prevalent. At night, this indicates entry into a lit tunnel, a lit underground garage, etc.

Furthermore or alternatively, the at least one sensor can comprise a rain sensor. In this case, the captured technical driving parameters can comprise a real-time precipitation onto the vehicle. By way of example, the rain sensor can capture a high level of precipitation onto the vehicle. In this case, the computing unit can use a suitable algorithm to determine that the air quality outside the vehicle is high, e.g. because the precipitation washes out pollutants from the air.

Furthermore or alternatively, the at least one sensor can comprise a speed sensor or tachometer. In this case, the captured technical driving parameters can comprise a real-time speed of the vehicle and/or the real-time speed of the vehicle with reference to a permitted maximum speed. The permitted maximum speed can be captured by means of a camera and/or may be stored locally in a navigation system in the vehicle.

By way of example, upwards of a captured determined speed of travel, e.g. 70 km/h, 80 km/h, 90 km/h, the computing unit of the vehicle can determine that sufficient swirling or whirling of noxious gases and fine dusts is taking place outside the vehicle and can therefore determine a good air quality outside the vehicle. Furthermore or alternatively, when a speed of travel that is below a permitted speed of travel at the current geographical location or on a route currently being taken is detected, the computing unit of the vehicle can determine that the vehicle is in a traffic queue or in traffic congestion and can therefore determine a poor air quality outside the vehicle.

Furthermore or alternatively, the at least one sensor can comprise an integrated garage door opener. The captured technical driving parameters in this case can comprise an activation of the integrated garage door opener.

When activation of the integrated garage door opener is detected, the computing unit (if necessary in combination with further determined technical driving parameters from one or more of the aforementioned sensors) can determine that the vehicle is driving into a garage and can therefore determine a poor air quality outside the vehicle. By way of example, one or more of the aforementioned sensors can be used to determine whether the vehicle is in the garage or in the open air when the garage door opener is activated and can therefore proactively control the recirculation or open-air circuit.

The aforementioned sensors can be combined as desired. The technical driving parameters can therefore be captured in any desired combination. The computing unit of the vehicle can use respectively suitable algorithms to determine an air quality in the interior and/or in the exterior of or outside the vehicle from any desired combination of technical driving parameters.

Advantageously, the air quality in the interior and/or exterior of the vehicle can therefore be determined robustly by means of already present sensors in the vehicle without the need for special, expensive air quality sensors in or on the vehicle. The air-conditioning system in the vehicle can therefore be controlled inexpensively, robustly and automatically in the vehicle with reference to the current air quality in the interior and/or in the exterior of the vehicle.

According to a second aspect, the underlying object is achieved by a method for robust automatic control of an air-conditioning system in a vehicle, comprising: using at least one sensor to continuously capture technical driving parameters of the vehicle; using a computing unit to determine a current air quality from the captured technical driving parameters by means of a suitable algorithm; using a control unit to control the air-conditioning system in the vehicle, comprising activating the recirculation circuit of the air-conditioning system and/or activating the fresh-air circuit of the air-conditioning system with reference to the determined air quality.

Preferably, the at least one sensor comprises:
a video camera, wherein the captured technical driving parameters comprise the image data captured by the video camera; and/or
a position determination unit, wherein the captured technical driving parameters comprise a current geographical position of the vehicle and/or a current number of real-time satellite connections; and/or
at least one radar sensor, wherein the captured technical driving parameters comprise detected objects and/or a speed of detected objects in the surroundings of the vehicle; and/or
at least one lidar sensor, wherein the captured technical driving parameters comprise detected objects and/or a speed of detected objects in the surroundings of the vehicle; and/or
at least one ultrasonic sensor, wherein the captured technical driving parameters comprise detected objects and/or the distance from detected objects in the surroundings of the vehicle; and/or
at least one light and/or solar sensor, wherein the captured technical driving parameters comprise a current brightness value and/or a change in the current brightness value; and/or
at least one rain sensor, wherein the captured technical driving parameters comprise a real-time precipitation onto the vehicle; and/or
at least one speed sensor, wherein the captured technical driving parameters comprise a real-time speed of the vehicle and/or the real-time speed of the vehicle with reference to a permitted maximum speed; and/or
at least one integrated garage door opener, wherein the captured technical driving parameters comprise an activation of the integrated garage door opener.

These and other objects, features and advantages of the present invention will become clear from studying the detailed description of preferred embodiments that follows and the accompanying figures. It is obvious that—although embodiments are described separately—individual features therefrom can be combined to produce additional embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
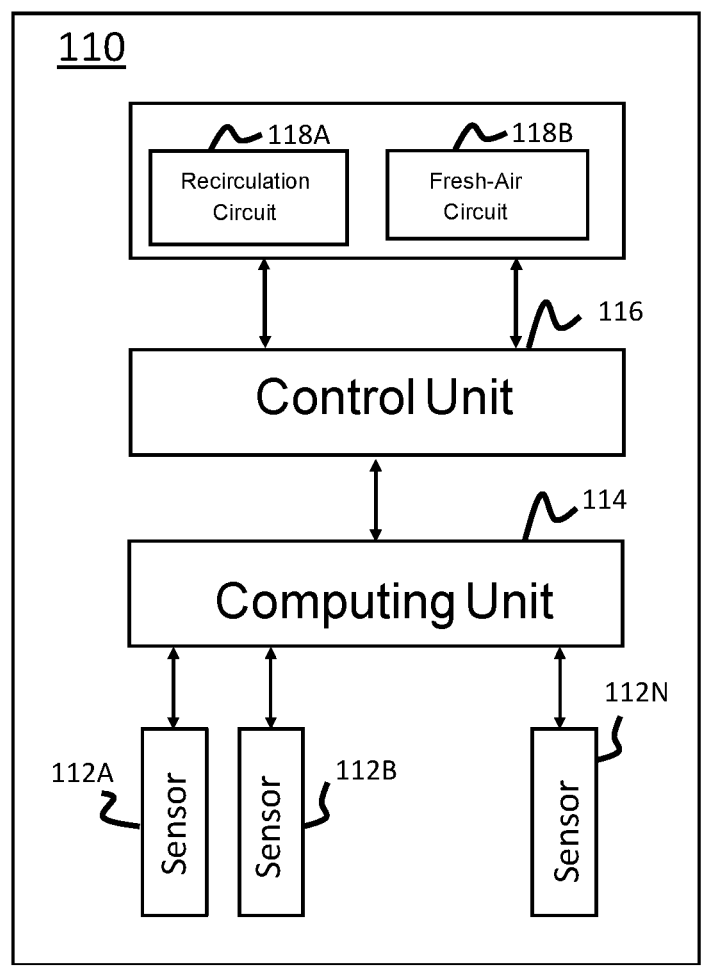
FIG. 1 shows a schematic system for robust automatic control of an air-conditioning system in a vehicle.

FIG. 1 schematically shows an exemplary system 100 for robust automatic control of an air-conditioning system 118 in a vehicle 110.

The system 100 comprises a vehicle 110. The vehicle 110 comprises at least one sensor 112A . . . 112N configured to continuously capture technical parameters with reference to the vehicle 110. In other words, the at least one sensor 112A . . . 112N captures technical values with reference to the vehicle 110. The sensor 112A . . . 112N does not capture values that relate to air quality. In other words, the at least one sensor 112A . . . 112N is not an air quality sensor (e.g. AUC (automatic recirculation control) sensor for detecting nitrous oxides ($NO_x$) and carbon monoxide (CO) and/or a fine-dust sensor for detecting fine-dust pollution and/or a vehicle interior sensor for detecting the air quality in the vehicle interior (e.g. as a result of smokers and other fine-dust sources) in or on the vehicle 110, in order to measure the burden on the vehicle occupants as a result of noxious gases from outside and/or as a result of air quality degradation in the vehicle interior (e.g. as a result of smokers and other fine-dust sources)).

The vehicle 110 comprises a computing unit 114 configured to receive the captured technical driving parameters and to use a suitable algorithm to process them in a suitable manner in order to determine an air quality from the captured technical driving parameters.

The vehicle 110 comprises a control unit 116 configured to control the recirculation circuit 118A and/or fresh-air circuit 118B of the air-conditioning system 118 in the vehicle 110, depending on the determined air quality. By way of example, if the air quality in the exterior of or outside the vehicle 110 is determined as good, the air-conditioning system 118 of the vehicle can be controlled such that the fresh-air circuit 118B is activated, whereas if the air quality in the exterior of or outside the vehicle 110 is determined as poor, the air-conditioning system 118 of the vehicle 110 can be controlled such that the recirculation circuit 118A is activated. Furthermore or alternatively, if the air quality in the vehicle 110 is determined as poor, the air-conditioning system 118 of the vehicle can be controlled such that the fresh-air circuit 118B is activated, whereas if the air quality in the interior of the vehicle 110 is determined as good, the air-conditioning system 118 can be controlled such that the recirculation circuit 118A is activated.

Advantageously, it is therefore possible to produce automatic, robust and inexpensive control of the recirculation circuit 118A and/or fresh-air circuit 118B of the air-conditioning system 118 in the vehicle 110, while at the same time being able to dispense with separate, cost-intensive air quality sensors for determining the air quality in the exterior and/or in the interior of the vehicle 110.

Preferably, the at least one sensor 112A . . . 112N comprises at least one video camera. In this case, the captured technical driving parameters comprise the images or image data captured by the video camera. The at least one video camera can comprise an interior camera. The computing unit 114 can evaluate the data or image data captured by the interior camera and, for example on detecting smoke in the interior of the vehicle 110, determine that the air quality in the interior of the vehicle 110 is poor. Furthermore or alternatively, the at least one video camera can comprise at least one camera aimed at the outside or outside the vehicle 110. The computing unit 114 can evaluate the image data and determine an air quality in the exterior of or outside the vehicle therefrom. By way of example, the computing unit, on determining that there are a multiplicity of vehicles around the vehicle 110, can determine that the air quality outside is poor, whereas, if it determines that there are natural objects (e.g. trees, scenery, mountains, lakes, etc.) around the vehicle 110, the air quality outside the vehicle 110 can be determined as good.

Furthermore or alternatively, the at least one sensor 112A . . . 112N can comprise a position determination unit. In this case, the captured technical driving parameters can comprise a current geographical position of the vehicle 110 and/or a current number of real-time satellite connections to the navigation satellite system. The computing unit 114 can determine a current air quality from the current geographical position—if necessary by taking into consideration a current time. Furthermore or alternatively, the captured technical driving parameters can comprise a number of satellite connections from the position determination unit to the navigation satellite system and/or a signal quality of the satellite connection(s) to the navigation satellite system. The computing unit 114 can use a suitable algorithm to determine from these technical driving parameters whether the vehicle is on a road that is clear overhead (e.g. a multiplicity of satellite connections having high signal quality), in a tunnel (e.g. no satellite connection), between high-rise buildings (e.g. a few satellite connections and/or poor signal quality), in a parking garage (e.g. no satellite connection) and/or in a garage (e.g. no satellite connection), and can determine a probable air quality in the exterior of or outside the vehicle 110 therefrom. By way of example, the computing unit can determine that the air quality outside the vehicle 110 is good on a road that is clear overhead, whereas the air quality outside the vehicle 110 is poor, discernible from different driving parameters, in a tunnel, parking garage and/or garage.

Furthermore or alternatively, the at least one sensor 112A . . . 112N can comprise a radar sensor. In this case, the captured technical driving parameters can comprise detected objects and/or a speed of detected objects in the surroundings of the vehicle 110. The computing unit 114 can use a suitable algorithm to determine an applicable air quality in the exterior of the vehicle 110 from the detected objects and/or a number of the detected objects and/or the type of the detected objects and/or the speed of the detected objects in the exterior of or outside the vehicle 110. By way of example, when a multiplicity of objects are detected around the vehicle 110 and/or when objects are moving around the vehicle 110, the computing unit can determine that the air quality outside the vehicle 110 is poor. In another example, when there are very few to absolutely no objects detected around the vehicle 110, the computing unit 114 can determine that the air quality outside the vehicle 110 is good.

Furthermore or alternatively, the at least one sensor 112A . . . 112N can comprise at least one lidar sensor. In this case, the captured technical driving parameters can comprise detected objects and/or a speed of detected objects in the surroundings of the vehicle 110. The computing unit 114 can use a suitable algorithm to determine an applicable air quality in the exterior of the vehicle 110 from the detected objects and/or a number of the detected objects and/or the type of the detected objects and/or the speed of the detected objects in the exterior of or outside the vehicle 110. By way of example, when a multiplicity of objects are detected around the vehicle 110 and/or when objects are moving around the vehicle 110, the computing unit 114 can determine that the air quality outside the vehicle 110 is poor. In another example, when there are very few to absolutely no objects detected around the vehicle 110, the computing unit 114 can determine that the air quality outside the vehicle 110 is good.

Furthermore or alternatively, the at least one sensor 112A . . . 112N can comprise at least one ultrasonic sensor. In this case, the captured technical driving parameters can comprise detected objects and/or the distance from detected objects in the immediate surroundings of the vehicle 110. The computing unit 114 can use a suitable algorithm to determine an applicable air quality in the exterior of the vehicle 110 from the detected objects and/or a number of the detected objects and/or the type of the detected objects and/or the speed of the detected objects in the immediate outer surroundings of the vehicle 110. By way of example, when there are a multiplicity of objects detected in the immediate surroundings of the vehicle 110 and/or when objects are moving in the immediate surroundings of the vehicle, the computing unit 114 can determine that the air quality outside the vehicle 110 is poor. In another example, when there are very few to absolutely no objects detected in the immediate surroundings of the vehicle 110, the computing unit 114 can determine that the air quality outside the vehicle 110 is good.

Furthermore or alternatively, the at least one sensor 112A . . . 112N can comprise a light sensor. In this case, the captured technical driving parameters can comprise a current brightness value and/or a change in the current brightness value. By way of example, the computing unit 114 can use a suitable algorithm to determine a characteristic change in the brightness value outside the vehicle 110. A change in the brightness value can be a falling brightness value detected by the light sensor during the day or when a high brightness value is prevalent. In daylight, this indicates entry by the vehicle 110 into a tunnel, an underground garage, etc. Analogously, a characteristic change in the brightness value can be a rising brightness value detected by the light sensor at night or when a low brightness value is prevalent. At night, this indicates entry by the vehicle 110 into a lit tunnel, a lit underground garage, etc.

Furthermore or alternatively, the at least one sensor 112A . . . 112N can comprise a rain sensor. In this case, the captured technical driving parameters can comprise a real-time precipitation onto the vehicle 110. By way of example, the rain sensor can capture a high level of precipitation onto the vehicle 110. In this case, the computing unit 114 can use a suitable algorithm to determine that the air quality outside the vehicle 110 is high, e.g. because the precipitation washes out pollutants from the air.

Furthermore or alternatively, the at least one sensor 112A . . . 112N can comprise a speed sensor or tachometer. In this case, the captured technical driving parameters can comprise a real-time speed of the vehicle 110 and/or the real-time speed of the vehicle 110 with reference to a permitted maximum speed. The permitted maximum speed can be captured by means of a camera and/or may be stored locally in a navigation system in the vehicle 110.

By way of example, upwards of a captured determined speed of travel, e.g. 70 km/h, 80 km/h, 90 km/h, the computing unit 114 of the vehicle can determine that sufficient swirling or whirling of noxious gases and fine dusts is taking place outside the vehicle 110 and can therefore determine a good air quality outside the vehicle 110. Furthermore or alternatively, when a speed of travel that is below a permitted speed of travel at the current geographical location or on a route currently being taken is detected, the computing unit 114 can determine that the vehicle 110 is in a traffic queue or in traffic congestion and can therefore determine a poor air quality outside the vehicle 110.

Furthermore or alternatively, the at least one sensor 112A . . . 112N can comprise an integrated garage door opener. The captured technical driving parameters in this case can comprise an activation of the integrated garage door opener.

When activation of the integrated garage door opener is detected, the computing unit 114 (if necessary in combination with further determined technical driving parameters from one or more of the aforementioned sensors) can use a suitable algorithm to determine that the vehicle 110 is driving into a garage and can therefore determine a poor air quality outside the vehicle 110. By way of example, one or more of the aforementioned sensors can be used to determine whether the vehicle is in the garage or in the open air when the garage door opener is activated and can therefore proactively control the recirculation or open-air circuit.

The aforementioned sensors 112A . . . 112N can be combined as desired. The technical driving parameters can therefore be captured in any desired combination. The computing unit 114 can use respectively suitable algorithms to determine an air quality in the interior and/or in the exterior of or outside the vehicle 110 from any desired combination of technical driving parameters.

Advantageously, the air quality in the interior and/or exterior of the vehicle 110 can therefore be determined robustly by means of already present sensors 112A . . . 112N in the vehicle 110 without the need for special, expensive air quality sensors in or on the vehicle 110. The air-conditioning system 118 in the vehicle 110 can therefore be controlled inexpensively, robustly and automatically in the vehicle with reference to the current air quality in the interior and/or in the exterior of the vehicle 110.

Figure 2:
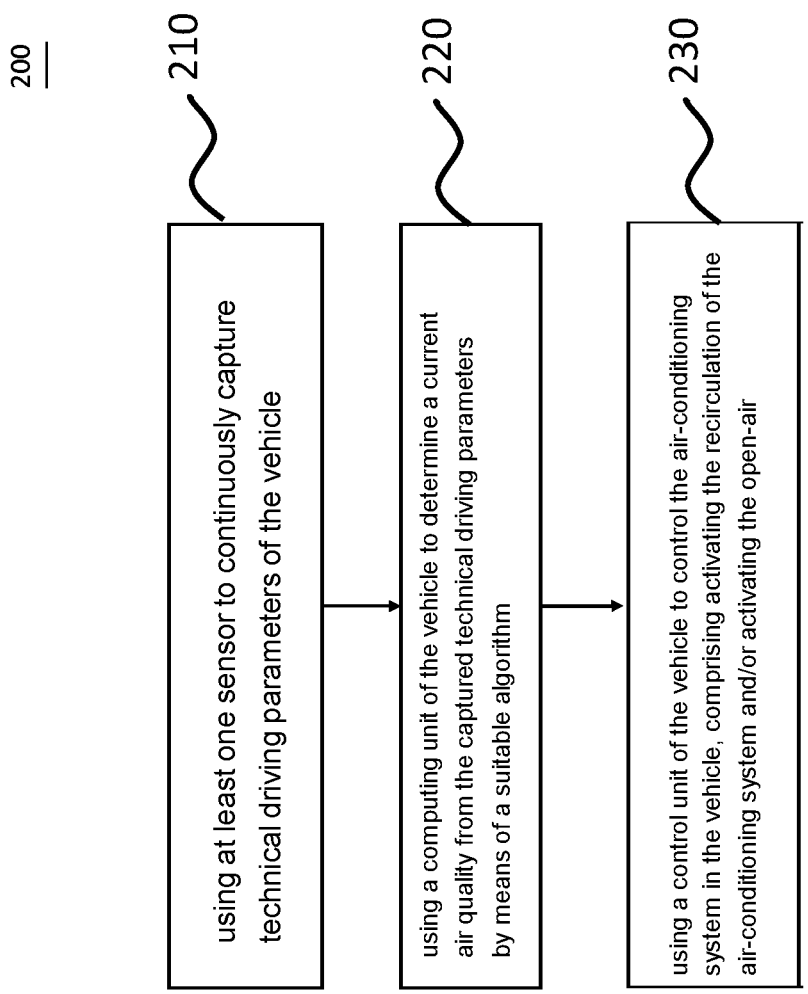
FIG. 2 shows a method for robust automatic control of an air-conditioning system in a vehicle.

FIG. 2 shows a method 200 for robust automatic control of an air-conditioning system 118 in a vehicle. The method 200 can be performed on a system 100 as described with reference to FIG. 1.

The method comprises:
using at least one sensor 112A . . . 112N to continuously capture 210 technical driving parameters of the vehicle 110;
using a computing unit 114 to determine 220 a current air quality from the captured technical driving parameters by way of a suitable algorithm; and
using a control unit 116 to control 230 the air-conditioning system 118 in the vehicle 110, comprising activating the recirculation circuit 118A of the air-conditioning system 118 and/or activating the fresh-air circuit 118B of the air-conditioning system 118 with reference to the determined air quality.

The at least one sensor 112A . . . 112N can comprise:
a video camera, wherein the captured technical driving parameters comprise the image data captured by the video camera; and/or
a position determination unit, wherein the captured technical driving parameters comprise a current geographical position of the vehicle 100 and/or a current number of real-time satellite connections; and/or
at least one radar sensor, wherein the captured technical driving parameters comprise detected objects and/or a speed of detected objects in the surroundings of the vehicle 110; and/or
at least one lidar sensor, wherein the captured technical driving parameters comprise detected objects and/or a speed of detected objects in the surroundings of the vehicle 110; and/or
at least one ultrasonic sensor, wherein the captured technical driving parameters comprise detected objects and/or the distance from detected objects in the surroundings of the vehicle 110; and/or at least one light and/or solar sensor, wherein the captured technical driving parameters comprise a current brightness value and/or a change in the current brightness value; and/or at least one rain sensor, wherein the captured technical driving parameters comprise a real-time precipitation onto the vehicle 110; and/or at least one speed sensor, wherein the captured technical driving parameters comprise a real-time speed of the vehicle 110 and/or the real-time speed of the vehicle 110 with reference to a permitted maximum speed; and/or at least one integrated garage door opener, wherein the captured technical driving parameters comprise an activation of the integrated garage door opener.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for automatic control of an air-conditioning system in a vehicle, comprising:
   at least one sensor configured to continuously capture technical driving parameters of the vehicle;
   a computer configured to determine a current air quality from the captured technical driving parameters without using an air quality sensor; and
   an electronic controller configured to control the air-conditioning system in the vehicle, wherein
      the control comprises activating a recirculation circuit and/or activating a fresh-air circuit of the air-conditioning system with reference to the determined current air quality,
      the at least one sensor comprises a position determination sensor,
      the captured technical driving parameters comprise a current geographical position of the vehicle and a current number of real-time satellite connections detected using the position determination sensor, and
      the current air quality is determined by the computer to be better with a greater number of current real-time satellite connections than with a fewer number of real-time satellite connections.

2. A method for automatic control of an air-conditioning system in a vehicle, comprising:
   continuously capturing, using at least one sensor, technical driving parameters of the vehicle;
   determining, using a computer, a current air quality from the captured technical driving parameters without using an air quality sensor; and
   controlling, using an electronic controller, the air-conditioning system in the vehicle, comprising activating a recirculation circuit of the air-conditioning system and/or activating a fresh-air circuit of the air-conditioning system with reference to the determined current air quality, wherein
      the at least one sensor comprises a position determination sensor,
      the captured technical driving parameters comprise a current geographical position of the vehicle and a current number of real-time satellite connections detected using the position determination sensor, and
      the current air quality is determined by the computer to be better with a greater number of current real-time satellite connections than with a fewer number of real-time satellite connections.

3. The system according to claim 1, wherein the at least one sensor comprises one or more of:
   a radar sensor, wherein the captured technical driving parameters comprise a number of detected objects using the radar sensor in surroundings of the vehicle, and
   the current air quality is determined to be better with a fewer number of detected objects than with a greater number of detected objects.

4. The system according to claim 1, wherein the at least one sensor comprises one or more of:
   a lidar sensor, wherein the captured technical driving parameters comprise a number of detected objects using the lidar sensor in surroundings of the vehicle, and
   the current air quality is determined to be better with a fewer number of detected objects than with a greater number of detected objects.

5. The system according to claim 1, wherein the at least one sensor comprises one or more of:
   an ultrasonic sensor, wherein the captured technical driving parameters comprise a number of detected objects using the ultrasonic sensor in surroundings of the vehicle, and
   the current air quality is determined to be better with a fewer number of detected objects than with a greater number of detected objects.

6. The system according to claim 1, wherein the at least one sensor comprises one or more of:
   a light sensor, wherein the captured technical driving parameters comprise a current brightness value and a change in the current brightness value detected by the light sensor, and
   the current air quality is determined to be worse when the current brightness value decreases from a prevalent higher brightness value, or
   the current air quality is determined to be worse when the current brightness value increases from a prevalent lower brightness value.

7. The system according to claim 1, wherein the at least one sensor comprises one or more of:
   a rain sensor, wherein the captured technical driving parameters comprise a real-time precipitation onto the vehicle detected by the rain sensor, and
   the current air quality is determined to be better with a greater amount of detected real-time precipitation onto the vehicle than with a lesser amount of detected real-time precipitation onto the vehicle.

8. The system according to claim 1, wherein the at least one sensor comprises one or more of:
   a speed sensor, wherein the captured technical driving parameters comprise a real-time speed of the vehicle detected by the speed sensor, and
   the current air quality is determined to be better with a higher real-time speed of the vehicle than with a lower real-time speed of the vehicle.

9. The system according to claim 1, wherein the at least one sensor comprises one or more of:
   an integrated garage door opener, wherein the captured technical driving parameters comprise an activation of the integrated garage door opener, and
   the current air quality is determined to be better, based on the activation of the integrated garage door opener and one or more additional sensors, when the vehicle is exiting a garage than when entering a garage.

10. The method according to claim 2, wherein the at least one sensor comprises one or more of:
a radar sensor, wherein the captured technical driving parameters comprise a number of detected objects using the radar sensor in surroundings of the vehicle, and
the current air quality is determined to be better with a fewer number of detected objects than with a greater number of detected objects.

11. The method according to claim 2, wherein the at least one sensor comprises one or more of:
a lidar sensor, wherein the captured technical driving parameters comprise a number of detected objects using the lidar sensor in surroundings of the vehicle, and
the current air quality is determined to be better with a fewer number of detected objects than with a greater number of detected objects.

12. The method according to claim 2, wherein the at least one sensor comprises one or more of:
an ultrasonic sensor, wherein the captured technical driving parameters comprise a number of detected objects using the ultrasonic sensor in surroundings of the vehicle, and
the current air quality is determined to be better with a fewer number of detected objects than with a greater number of detected objects.

13. The method according to claim 2, wherein the at least one sensor comprises one or more of:
a light sensor, wherein the captured technical driving parameters comprise a current brightness value and a change in the current brightness value detected by the light sensor, and
the current air quality is determined to be worse when the current brightness value decreases from a prevalent higher brightness value, or
the current air quality is determined to be worse when the current brightness value increases from a prevalent lower brightness value.

14. The method according to claim 2, wherein the at least one sensor comprises one or more of:
a rain sensor, wherein the captured technical driving parameters comprise a real-time precipitation onto the vehicle detected by the rain sensor, and
the current air quality is determined to be better with a greater amount of detected real-time precipitation onto the vehicle than with a lesser amount of detected real-time precipitation onto the vehicle.

15. The method according to claim 2, wherein the at least one sensor comprises one or more of:
a speed sensor, wherein the captured technical driving parameters comprise a real-time speed of the vehicle detected by the speed sensor, and
the current air quality is determined to be better with a higher real-time speed of the vehicle than with a lower real-time speed of the vehicle.

16. The method according to claim 2, wherein the at least one sensor comprises one or more of:
an integrated garage door opener, wherein the captured technical driving parameters comprise an activation of the integrated garage door opener, and
the current air quality is determined to be better, based on the activation of the integrated garage door opener and one or more additional sensors, when the vehicle is exiting a garage than when entering a garage.

17. A system for automatic control of an air-conditioning system in a vehicle, comprising:
at least one sensor configured to continuously capture technical driving parameters of the vehicle;
a computer configured to determine a current air quality from the captured technical driving parameters without using an air quality sensor; and
an electronic controller configured to control the air-conditioning system in the vehicle, wherein
the control comprises activating a recirculation circuit and/or activating a fresh-air circuit of the air-conditioning system with reference to the determined current air quality,
the at least one sensor comprises a speed sensor,
the captured technical driving parameters comprise a real-time speed of the vehicle detected by the speed sensor, and
the current air quality is determined to be better with a higher real-time speed of the vehicle than with a lower real-time speed of the vehicle.

18. The system according to claim 17, wherein the at least one sensor comprises one or more of:
a light sensor, wherein the captured technical driving parameters comprise a current brightness value and a change in the current brightness value detected by the light sensor, and
the current air quality is determined to be worse when the current brightness value decreases from a prevalent higher brightness value, or
the current air quality is determined to be worse when the current brightness value increases from a prevalent lower brightness value.

19. The system according to claim 17, wherein the at least one sensor comprises one or more of:
a radar sensor, wherein the captured technical driving parameters comprise a number of detected objects using the radar sensor in surroundings of the vehicle, and
the current air quality is determined to be better with a fewer number of detected objects than with a greater number of detected objects.

20. The system according to claim 17, wherein the at least one sensor comprises one or more of:
a rain sensor, wherein the captured technical driving parameters comprise a real-time precipitation onto the vehicle detected by the rain sensor, and
the current air quality is determined to be better with a greater amount of detected real-time precipitation onto the vehicle than with a lesser amount of detected real-time precipitation onto the vehicle.

* * * * *